(12) United States Patent
Barnette et al.

(10) Patent No.: US 9,379,619 B2
(45) Date of Patent: Jun. 28, 2016

(54) DIVIDING A SINGLE PHASE PULSE-WIDTH MODULATION SIGNAL INTO A PLURALITY OF PHASES

(71) Applicant: LENOVO ENTERPRISE SOLUTIONS (SINGAPORE) PTE. LTD., Singapore (SG)

(72) Inventors: Jamaica L. Barnette, Durham, NC (US); Luke D. Remis, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/519,569

(22) Filed: Oct. 21, 2014

(65) Prior Publication Data
US 2016/0111960 A1    Apr. 21, 2016

(51) Int. Cl.
*H02M 3/338* (2006.01)
*H02M 3/335* (2006.01)

(52) U.S. Cl.
CPC .............................. *H02M 3/33507* (2013.01)

(58) Field of Classification Search
CPC ........ G05F 3/16; H02M 3/335; H02M 3/1584
USPC .......... 363/21.1, 16, 17, 21.12, 21.17, 37, 39, 363/41, 96, 97, 98, 21.04, 131–134; 323/222, 271, 280–288, 225, 247, 323/266–267; 290/44, 55; 326/26, 27, 30, 326/80, 86, 99, 87; 330/54, 147, 261, 144; 257/531, 533, 691, 724, 686
See application file for complete search history.

(56) References Cited

U.S. PATENT DOCUMENTS

| | | |
|---|---|---|
| 3,239,798 A | 3/1966 | Silver |
| 3,969,752 A | 7/1976 | Martin et al. |
| 4,193,083 A | 3/1980 | Max |
| 4,232,254 A | 11/1980 | Haferl |
| 4,447,866 A | 5/1984 | Reeves |

(Continued)

FOREIGN PATENT DOCUMENTS

| | | |
|---|---|---|
| GB | 2484010 A | 3/2012 |
| JP | 55-111664 | 8/1980 |

(Continued)

OTHER PUBLICATIONS

Padiyar, U.H., et al., "A System Level Solution to Improve VRM Efficiency", IEEE International Conference on Industrial Technology, Feb. 10-13, 2009, pp. 1-5, IEEE, USA, Digital Object Identifier: 10.1109/ICIT.2009.4939661.

(Continued)

*Primary Examiner* — Adolf Berhane
*Assistant Examiner* — Nusrat Quddus
(74) *Attorney, Agent, or Firm* — Edward J. Lenart; Katherine S. Brown; Kennedy Lenart Spraggins LLP

(57) ABSTRACT

Dividing a single phase PWM signal into a plurality of phases includes: receiving, from a phase controller by a PWM frequency divider, an input pulse train comprising a period; and dividing, by the PWM frequency divider, the input pulse train amongst a plurality of output phases of the PWM frequency divider, including, at the onset of each period of the input pulse train: providing, on a next output phase of the PWM frequency divider, an output pulse train; and holding all other output phases at a tri-state voltage level.

14 Claims, 8 Drawing Sheets

Identity Switching DC-DC Converter 200

(56) References Cited

U.S. PATENT DOCUMENTS

| | | | |
|---|---|---|---|
| 4,581,693 A * | 4/1986 | Ueda | H02M 7/527 318/811 |
| 4,615,000 A * | 9/1986 | Fujii | H02M 7/53873 318/811 |
| 4,720,667 A | 1/1988 | Lee et al. | |
| 4,720,668 A | 1/1988 | Lee et al. | |
| 4,785,387 A | 11/1988 | Lee et al. | |
| 4,841,220 A | 6/1989 | Tabisz et al. | |
| 4,851,769 A | 7/1989 | Carpenter et al. | |
| 4,857,822 A | 8/1989 | Tabisz et al. | |
| 4,860,184 A | 8/1989 | Tabisz et al. | |
| 4,866,367 A | 9/1989 | Ridley et al. | |
| 4,866,525 A | 9/1989 | Rodriguez-Cavazos et al. | |
| 4,931,716 A | 6/1990 | Jovanovic et al. | |
| 4,961,048 A | 10/1990 | Banura | |
| 5,063,488 A | 11/1991 | Harada et al. | |
| 5,068,776 A | 11/1991 | Polivka | |
| 5,122,728 A | 6/1992 | Ashley | |
| 5,204,809 A | 4/1993 | Andresen | |
| 5,262,930 A | 11/1993 | Hua et al. | |
| 5,325,283 A | 6/1994 | Farrington et al. | |
| 5,329,439 A | 7/1994 | Borojevic et al. | |
| 5,373,432 A | 12/1994 | Vollin et al. | |
| 5,418,702 A | 5/1995 | Marinus et al. | |
| 5,418,704 A | 5/1995 | Hua et al. | |
| 5,432,695 A | 7/1995 | Vlatkovic et al. | |
| 5,442,540 A | 8/1995 | Hua et al. | |
| 5,477,858 A | 12/1995 | Norris et al. | |
| 5,479,087 A | 12/1995 | Wright | |
| 5,486,752 A | 1/1996 | Hua et al. | |
| 5,530,396 A | 6/1996 | Vlatkovic et al. | |
| 5,541,828 A | 7/1996 | Rozman | |
| 5,574,636 A | 11/1996 | Lee et al. | |
| 5,633,793 A | 5/1997 | Lee et al. | |
| 5,694,302 A | 12/1997 | Faulk | |
| 5,793,272 A | 8/1998 | Burghartz et al. | |
| 5,914,572 A | 6/1999 | Qian et al. | |
| 5,920,471 A | 7/1999 | Rajagopalan et al. | |
| 5,949,199 A | 9/1999 | Qian et al. | |
| 6,018,468 A | 1/2000 | Archer et al. | |
| 6,043,634 A | 3/2000 | Nguyen et al. | |
| 6,057,652 A | 5/2000 | Chen et al. | |
| 6,114,937 A | 9/2000 | Burghartz et al. | |
| 6,147,882 A | 11/2000 | Huber et al. | |
| 6,211,579 B1 | 4/2001 | Blair | |
| 6,268,093 B1 | 7/2001 | Kenan et al. | |
| 6,330,170 B1 | 12/2001 | Wang et al. | |
| 6,337,801 B2 | 1/2002 | Li et al. | |
| 6,344,956 B1 | 2/2002 | Morita | |
| 6,349,044 B1 | 2/2002 | Canales-Abarca et al. | |
| 6,362,986 B1 | 3/2002 | Schultz et al. | |
| 6,414,469 B1 | 7/2002 | Zhou et al. | |
| 6,426,666 B1 | 7/2002 | Li et al. | |
| 6,437,999 B1 | 8/2002 | Wittenbreder | |
| 6,442,033 B1 | 8/2002 | Liu et al. | |
| 6,452,815 B1 | 9/2002 | Zhu et al. | |
| 6,466,459 B1 | 10/2002 | Guerrera | |
| 6,480,086 B1 | 11/2002 | Kluge et al. | |
| 6,531,740 B2 | 3/2003 | Bosco et al. | |
| 6,545,450 B1 | 4/2003 | Ledenev et al. | |
| 6,552,565 B2 | 4/2003 | Chang et al. | |
| 6,552,917 B1 | 4/2003 | Bourdillon | |
| 6,587,356 B2 | 7/2003 | Zhu et al. | |
| 6,590,791 B1 | 7/2003 | Zhou et al. | |
| 6,600,640 B1 | 7/2003 | Buscher et al. | |
| 6,636,430 B1 | 10/2003 | Batarseh et al. | |
| 6,650,217 B1 | 11/2003 | Wolf et al. | |
| 6,683,797 B2 | 1/2004 | Zaitsu et al. | |
| 6,696,803 B2 | 2/2004 | Tao et al. | |
| 6,696,823 B2 | 2/2004 | Ledenev et al. | |
| 6,710,639 B2 | 3/2004 | Huang et al. | |
| 6,737,842 B2 | 5/2004 | Bai et al. | |
| 6,757,184 B2 | 6/2004 | Wei et al. | |
| 6,781,853 B2 | 8/2004 | Xu et al. | |
| 6,784,644 B2 | 8/2004 | Xu et al. | |
| 6,800,985 B2 | 10/2004 | Baker et al. | |
| 6,815,937 B2 | 11/2004 | Poon et al. | |
| 6,819,574 B2 | 11/2004 | Xu et al. | |
| 6,834,002 B2 | 12/2004 | Yang | |
| 6,859,372 B2 | 2/2005 | Xu et al. | |
| 6,876,556 B2 | 4/2005 | Zhu et al. | |
| 6,933,541 B1 | 8/2005 | Huang | |
| 6,944,033 B1 | 9/2005 | Xu et al. | |
| 6,952,335 B2 | 10/2005 | Huang et al. | |
| 6,989,997 B2 | 1/2006 | Xu et al. | |
| 7,016,203 B2 | 3/2006 | Xu et al. | |
| 7,046,527 B2 | 5/2006 | West | |
| 7,071,660 B2 | 7/2006 | Xu et al. | |
| 7,106,035 B2 | 9/2006 | Xing | |
| 7,109,838 B2 | 9/2006 | Brennan et al. | |
| 7,132,820 B2 | 11/2006 | Walters et al. | |
| 7,161,335 B2 | 1/2007 | Wei et al. | |
| 7,180,389 B2 | 2/2007 | Wang et al. | |
| 7,184,281 B2 | 2/2007 | Ren et al. | |
| 7,196,914 B2 | 3/2007 | Ren et al. | |
| 7,199,695 B1 | 4/2007 | Zhou et al. | |
| 7,233,132 B1 | 6/2007 | Dong et al. | |
| 7,254,047 B2 | 8/2007 | Ren et al. | |
| 7,265,525 B2 | 9/2007 | Xu et al. | |
| 7,304,867 B2 | 12/2007 | Usui | |
| 7,317,305 B1 | 1/2008 | Stratakos et al. | |
| 7,352,269 B2 | 4/2008 | Li et al. | |
| 7,358,710 B2 | 4/2008 | Luo et al. | |
| 7,391,165 B2 | 6/2008 | Lee et al. | |
| 7,447,924 B2 | 11/2008 | May | |
| 7,498,782 B2 | 3/2009 | Nguyen et al. | |
| 7,498,920 B2 | 3/2009 | Sullivan et al. | |
| 7,528,625 B2 | 5/2009 | Ozasa et al. | |
| 7,531,407 B2 | 5/2009 | Clevenger et al. | |
| 7,545,208 B2 | 6/2009 | Rodriguez | |
| 7,548,137 B2 | 6/2009 | Wang et al. | |
| 7,554,423 B2 | 6/2009 | Wang et al. | |
| 7,560,833 B2 | 7/2009 | Strzalkowski et al. | |
| 7,560,912 B2 | 7/2009 | Xu et al. | |
| 7,569,875 B2 | 8/2009 | Suzuki et al. | |
| 7,570,037 B2 | 8/2009 | Li et al. | |
| 7,583,065 B2 | 9/2009 | Xu et al. | |
| 7,602,154 B2 | 10/2009 | Fu et al. | |
| 7,602,159 B2 | 10/2009 | Wang et al. | |
| 7,605,572 B2 | 10/2009 | Xu et al. | |
| 7,613,020 B2 | 11/2009 | Nukisato et al. | |
| 7,638,988 B2 | 12/2009 | Lim et al. | |
| 7,649,434 B2 | 1/2010 | Xu et al. | |
| 7,705,577 B2 | 4/2010 | Li et al. | |
| 7,742,318 B2 | 6/2010 | Fu et al. | |
| 7,746,041 B2 | 6/2010 | Xu et al. | |
| 7,746,675 B2 | 6/2010 | Wang et al. | |
| 7,791,321 B2 | 9/2010 | Xu et al. | |
| 7,800,922 B2 | 9/2010 | Takayanagi et al. | |
| 7,804,281 B2 | 9/2010 | Wang et al. | |
| 7,821,375 B2 | 10/2010 | Dong et al. | |
| 7,859,238 B1 | 12/2010 | Stratakos et al. | |
| 7,872,886 B2 | 1/2011 | Xu et al. | |
| 7,876,191 B2 | 1/2011 | Chandrasekaran et al. | |
| 7,893,669 B2 | 2/2011 | Osterhout et al. | |
| 7,932,800 B2 | 4/2011 | Lim et al. | |
| 7,965,165 B2 | 6/2011 | Ikriannikov et al. | |
| 7,977,763 B2 | 7/2011 | Lin et al. | |
| 7,982,441 B2 | 7/2011 | Crowther et al. | |
| 8,030,908 B2 | 10/2011 | Huang | |
| 8,044,645 B2 | 10/2011 | Zambetti et al. | |
| 8,053,890 B2 | 11/2011 | Puma et al. | |
| 8,072,200 B1 | 12/2011 | Qiu et al. | |
| 8,208,878 B1 | 6/2012 | Hardy et al. | |
| 8,238,122 B2 | 8/2012 | Torrico-Bascope et al. | |
| 8,258,734 B2 * | 9/2012 | Takeuchi | H02P 6/085 310/156.01 |
| 8,416,043 B2 | 4/2013 | Ikriannikov | |
| 8,576,000 B2 | 11/2013 | Kim et al. | |
| 8,592,966 B2 | 11/2013 | Wood et al. | |
| 8,947,186 B2 | 2/2015 | Kurs et al. | |
| 8,957,514 B1 | 2/2015 | Barnette | |
| 2002/0096697 A1 | 7/2002 | Tihanyi | |
| 2005/0225307 A1 | 10/2005 | Sato et al. | |

(56) References Cited

U.S. PATENT DOCUMENTS

| | | |
|---|---|---|
| 2006/0291260 A1 | 12/2006 | Nakashima |
| 2007/0195563 A1 | 8/2007 | Shiraishi et al. |
| 2007/0252659 A1 | 11/2007 | Suenaga et al. |
| 2008/0067990 A1 | 3/2008 | Wei |
| 2009/0086514 A1 | 4/2009 | Fornage et al. |
| 2010/0127683 A1 | 5/2010 | Uno et al. |
| 2011/0043173 A1 | 2/2011 | Blaumeiser et al. |
| 2011/0090716 A1 | 4/2011 | Asuke et al. |
| 2011/0133716 A1 | 6/2011 | Cheung et al. |
| 2011/0248812 A1 | 10/2011 | Hu et al. |
| 2011/0279100 A1 | 11/2011 | Ikriannikov |
| 2011/0313749 A1 | 12/2011 | Wu |
| 2012/0002446 A1 | 1/2012 | Madawala et al. |
| 2013/0099887 A1 | 4/2013 | Yamamoto |
| 2013/0141878 A1 | 6/2013 | Wu et al. |
| 2013/0154590 A1 | 6/2013 | Ragona et al. |
| 2013/0154595 A1 | 6/2013 | Drinovsky |
| 2013/0221885 A1 | 8/2013 | Hunter |
| 2013/0229830 A1 | 9/2013 | Barnette et al. |
| 2013/0229831 A1 | 9/2013 | Barnette et al. |
| 2014/0132234 A1 | 5/2014 | Barnette et al. |
| 2014/0132237 A1 | 5/2014 | Barnette et al. |
| 2014/0145688 A1 | 5/2014 | Ikriannikov |
| 2015/0097615 A1 | 4/2015 | Barnette |

FOREIGN PATENT DOCUMENTS

| | | |
|---|---|---|
| JP | 05-022935 | 1/1993 |
| JP | 02012-060854 A | 3/2012 |
| TW | 271917 B1 | 1/2007 |
| WO | WO 2010/002906 A2 | 1/2010 |

OTHER PUBLICATIONS

Sullivan, C. R., "Computationally Efficient Winding Loss Calculation with Multiple Windings, Arbitrary Waveforms and Two- or Three-Dimensional Field Geometry", IEEE Transactions on Power Electronics, Jan. 2001, pp. 142-150, vol. 16, No. 1, IEEE, USA, Digital Object Identifier: 10.1109/63.903999.

Kelly, S. et al., "Core Materials for High Frequency VRM Inductors", Power Electronics Specialists Conference, Jun. 17-21, 2007, pp. 1767-1772, IEEE, USA, Digital Object Identifier: 10.1109/PESC.2007.4342267.

Prabhakaran, S., et al., "Fabrication of Thin-Film V-Groove Inductors Using Composite Magnetic Materials", International Workshop on Integrated Power Packaging, Jul. 2000, pp. 102-105, Digital Object Identifier: 10.1109/IWIPP.2000.885191, IEEE, USA.

Ghahary, A., "Fully Integrated DC-DC Converters", Power Electronics Technology, Aug. 2004, pp. 24-27, Penton Business Media Inc., Overland Park, KS, USA.

Park, J., et al., "Fully Integrated Micromachined Inductors With Electroplated Anisotropic Magnetic Cores", Thirteenth Annual Applied Power Electronics Conference and Exposition, Feb. 15-19, 1998, pp. 379-385 vol. 1, Digital Object Identifier: 10.1109/APEC.1998.647718, IEEE, USA.

Yao, K., et al., "Design Considerations for VRM Transient Response Based on the Output Impedance", IEEE Transactions on Power Electronics, Nov. 2003, pp. 1270-1277, vol. 18, No. 6, Digital Object Identifier: 10.1109/TPEL.2003.818824, IEEE, USA.

Parker, S., "Characterizing Properties of Magnetic Films Deposited on Silicon Wafers", May 2009, pp. 39-42, Tuscaloosa, AL, USA.

"Physics Lecture 17—Magnetic Fields cont'd.", upenn.edu (online), accessed Sep. 7, 2011, 5 pages, URL: http://www.physics.upenn.edu/courses/gladney/phys151/lectures/lecture_mar_07_2003.shtml#tth_sEc8.3.

Wang, N., et al.,"Micro-fabricated inductors on silicon for DC-DC converters operating at tens MHz", powersoc.org (online), accessed Feb. 10, 2012, 1 page, URL: http://www.powersoc.org/PwrSOC08/Presentations/Received/Poster%20P12%20-%20Ningning%20Wang%20et%20al.%20-%20Micro-fabricated%20inductors%20on%20silicon%20for%20DC-DC%20converters%20operating%20at%20tens%20of%20MHz.pdf.

O'Donnell, T., et al., "Microfabricated Inductors for 20 MHz Dc-Dc Converters", Twenty-Third Annual IEEE Applied Power Electronics Conference and Exposition, Feb. 24-28, 2008, pp. 689-693, Digital Object Identifier: 10.1109/APEC.2008.4522796, IEEE, USA.

Phillips, M.D, et al., "A Novel Toroidal Inductor Structure With Through-Hole Vias in Ground Plane", IEEE Transactions on Microwave Theory and Techniques, Jun. 2006, pp. 1325-1330, vol. 54, No. 4, Digital Object Identifier: 10.1109/TMTT.2006.871352, IEEE, USA.

Raieszadeh, M.,"High-Q Integrated Inductors on Trenched Silicon Islands", Thesis, Apr. 12, 2005, pp. 1-92, Georgia Institute of Technology, USA.

Kelly, S., et al., "Core Materials for High Frequency VRM Inductors", IEEE Power Electronics Specialists Conference, Jun. 17-21, 2007, pp. 1767-1772, Digital Object Identifier: 10.1109/PESC.2007.4342267, IEEE, Orlando, FL, USA.

Rincon-Mora, G.A., et al., "How to fully integrate switching DC-DC supplies with inductor multipliers", EE Times Design, Dec. 18, 2005, pp. 1-3, UBM Electronics, San Francisco, CA, USA.

"Toroidal Magnetic Field," hyperphysics.phy-astr.gsu.edu (online), accessed Sep. 7, 2011, 3 pages, URL: http://hyperphysics.phy-astr.gsu.edu/hbase/magnetic/toroid.html.

Steiner, et al., "A Tuning Transformer for the Automatic Adjustment of Resonant Loop Antennas in RFID Systems", 2004 IEEE International Conference on Industrial Technology (IEEE ICIT '04), Dec. 2004, pp. 912-916, IEEE, Digital Object Identifier: 10.1109/ICIT.2004.1490196.

Wegleiter, et al., "Automatic Antenna Tuning Unit to Improve RFID System Performance", IEEE Transactions on Instrumentation and Measurement, May 2011, pp. 2797-2803 (section III), vol. 60, Issue 8, IEEE, Digital Object Identifier: 10.1109/TIM.2011.2122390.

Taheri, M., et al., "Analysis and Design of a New Soft Switching Interleaved Converter Using an Integrated Transformer", 2011 $2^{nd}$ Power Electronics, Drive Systems and Technologies Conference (PEDSTC), Feb. 16-17, 2011, pp. 98-103, IEEE, New York, Digital Object Identifier: 10.1109/PEDSTC.2011.5742505.

Xuechao, L., et al., "A Non-isolated Voltage Regulator Module With Integrating Coupled-Inductor", from IEEE $36^{th}$ Power Electronics Specialists Conference 2005 (PESC '05), Jun. 16, 2005, pp. 438-442, IEEE, New York, Digital Object Identifier: 10.1109/PESC.2005.1581661.

Cho, et al., "A Novel Transformer Winding for Phase Shift Full Bridge Converter", 31st International Telecommunications Energy Conference 2009 (INTELEC 2009), Oct. 18-22, 2009, pp. 1-5, IEEE, New York, Digital Object Identifier: 10.1109/INTLEC.2009.5351785.

Do, H.L., "Interleaved Boost Converter With a Single Magnetic Component", IET Power Electronics, Aug. 2011, pp. 842-849, vol. 4, Issue. 7, IEEE, United Kingdom, Digital Object Identifier: 10.1049/iet-pel.2010.0256.

Qian, T., et al., "Coupled Input-Series and Output-Parallel Dual Interleaved Flyback Converter for High Input Voltage Application", IEEE Transactions on Power Electronics, Jan. 2008, pp. 88-95, vol. 23, Issue. 1, IEEE, New York, Digital Object Identifier: 10.1109/TPEL.2007.911867.

University of Colorado, Boulder, "The Flyback Converter", Lecture Notes ECEN 4517: Power Electronics and Photovoltaic Power Systems Laboratory, Department of Electrical and Computer Engineering, Spring 2011, pp. 1-11, University of Colorado, Boulder, CO.

Dixon, "Inductor and Flyback Transformer Design", 2001 Magnetics Design Handbook—MAG100A, Mar. 15, 2001, pp. 5-1 to 5-19, Section 5, Texas Instruments Incorporated, Dallas, Texas, USA.

Dixon Jr, L., "The Effects of Leakage Inductance on Switching Power Supply Performance", 2001 Magnetics Design Handbook—MAG100A, Mar. 15, 2001, pp. R4 to R7, Texas Instruments Incorporated, Dallas, TX, USA.

Zhou et al.; "Exploration of On-Chip Switched-Capacitor DC-DC Converter for Multicore Processors Using a Distributed Power Delivery Network", Custom Integrated Circuits Conference (CICC), Sep. 2011, pp. 1-4, IEEE.org (online), doi: 10.1109/CICC.2011.6055333,

(56) References Cited

OTHER PUBLICATIONS

URL: http://ieeexplore.ieee.org/stamp/stamp.jsp?tp=&arnumber=6055333&isnumber=6055276.

Kudva et al.; "Fully-Integrated On-Chip DC-DC Converter With a 450X Output Range", 2010 IEEE Custom Integrated Circuits Conference (CICC), Sep. 2010, pp. 1-4, IEEE.org (online), doi: 10.1109/CICC.2010.5617588, URL: http://ieeexplore.ieee.org/stamp/stamp.jsp?tp=&arnumber=5617588&isnumber=5617377.

Garner et al., "The Integration of High-Side and Low-Side LIGBTS on Partial Silicon-On-Insulator", Solid-State Electronics, vol. 44, Issue 6, Jun. 2000, pp. 929-935, sciencedirect.com (online), doi: 10.1016/S0038-1101(00)00018-6, URL: http://dx.doi.org/10.1016/S0038-1101(00)00018-6.

Oraw et al., "Lossless DCR Current Sensing for Multi-Winding Coupled Inductors", IEEE 30th International Telecommunications Energy Conference (INTELEC 2008), Sep. 2008, 6 pages, IEEE Xplore Digital Library (online) (ieeexplore.ieee.org), DOI: 10.1109/INTLEC.2008.4664023.

Xiao et al., "Parasitic resistance current sensing topology for coupled inductors", International Journal of Electronics, vol. 96, No. 1, Jan. 2009, pp. 51-61, Taylor & Francis (online) (informaworld.com), DOI: 10.1080/00207210802492336.

Ikriannikov et al., "Investigation of DCR Current Sensing in Multiphase Voltage Regulators", Volterra Semiconductor: IBM Power and Cooling Technology Symposium, Oct. 2007, 17 pages, IBM Corporation, USA.

Xu et al., "Novel Coupled-Inductor Multi-phase VRs", Twenty Second Annual IEEE Applied Power Electronics Conference (APEC 2007), Feb. 25-Mar. 1, 2007, pp. 113-119, IEEE Xplore Digital Library (online) (ieeexplore.ieee.org), DOI: 10.1109/APEX.2007.357503.

Dong et al., "DCR Current Sensing Method for Achieving Adaptive Voltage Positioning(AVP) in Voltage Regulators with Coupled Inductors", 37th IEEE Power Electronics Specialists Conference (PESC '06), Jun. 2006, 7 pages, IEEE Xplore Digital Library (online) (ieeexplore.ieee.org), DOI: 10.1109/PESC.2006.1712003.

U.S. Appl. No. 14/465,064, Aug. 21, 2014, pp. 1-39.

Goldman, M., et al., Analysis and Prediction of Regulation in a Multiple-Output Current-Mode Controlled DC-to-DC Converter, IEEE Transactions on Aerospace and Electronic Systems, vol. 31, Issue: 2, Apr. 1995, pp. 626-633, Institute of Electrical and Electronics Engineers (IEEE), USA, Digital Object Identifier: 10.1109/7.381911.

* cited by examiner

*Prior Art*

Prior Art DC-DC Converter
100

Prior Art DC-DC Converter
Timing Diagram 130

Identity Switching DC-DC
Converter Timing Diagram
230

Identity Switching DC-DC Converter 500

DIVIDING A SINGLE PHASE PULSE-WIDTH MODULATION SIGNAL INTO A PLURALITY OF PHASES

BACKGROUND OF THE INVENTION

1. Field of the Invention

The field of the invention is data processing, or, more specifically, methods and apparatus for dividing a single phase pulse-width modulation (PWM) signal into a plurality of phases.

2. Description of Related Art

Computer system technology is continually advancing. Data centers, for example, now include hundreds or thousands of servers. Given the number of servers in a data center, decreasing the physical size or 'footprint' of the servers is a top priority for server system and server component designers. One area of focus, for example, is in reducing the size of Direct Current ('DC')-DC converters that distribute DC power amongst components of servers and the like.

In current art, reducing the size of such DC-DC converters is limited, at least in part, by the need for a plurality of output inductors and a filter capacitor. Some DC-DC converters of the prior art have implemented designs to somewhat reduce the physical footprint of the inductors and the capacitor by utilizing a single magnetic core for multiple inductors—an implementation of an indirectly coupled inductor. FIG. 1, for example, sets forth a prior art DC-DC converter that includes an indirectly coupled inductor.

The example DC-DC converter (100) of FIG. 1 includes two power-switching phases (132, 134). Each phase includes two switches: a high-side switch (102, 106), and a low-side switch (104, 108). Each high-side switch (102, 106) includes a control input (110, 114) to activate the switch. Upon activation, each high-side switch (102, 106) couples a voltage source ($V_{IN}$) to an indirectly coupled inductor (118). Each low-side switch (104, 108) also includes a control input (112, 116) to activate the switch. Upon activation, each low-side switch (104, 108) couples one coil of indirectly coupled inductor (118) to a ground voltage.

Coupled inductors come in two forms: indirectly coupled and directly coupled. The dots depicted in the example of FIG. 1 indicate the coupled inductor (118) is an indirectly coupled inductor. The dot convention specifies the flow of current in a coupled inductor as: when current flows 'into' one dot, current is induced in the alternate coil of the coupled inductor and flows 'out of' the other dot. Thus, in an indirectly coupled inductor, current generally flows in the same direction in both coils of the coupled inductor.

The example prior art DC-DC converter (100) of FIG. 1 also includes an output capacitor (120) that operates as a filter and a load, represented by a resistor (122).

FIG. 2 sets forth an example timing diagram (130) of activating the switches (102, 112, 106, 116) of the prior art DC-DC converter (100) of FIG. 1. In the example timing diagram of FIG. 2, switch (102) is activated between time $T_0$ and $T_1$, then deactivated from $T_1$ through $T_3$. Switch (112) is not activated from time $T_0$ and $T_1$, but is activated at time $T_1$ through $T_3$. Switch (114) is only activated between time $T_2$ to $T_3$. Switch (116) is activated from time $T_0$ to $T_2$ and activated again at time $T_3$.

The timing diagram (130) in the example of FIG. 2 specifies that activation of the high-side switch and low-side switch in a single phase of the prior art DC-DC converter (100) of FIG. 1 is asynchronous. Further, during any one given time period, two of the switches are activated at the same time. Although the indirectly coupled inductor in the example prior art DC-DC converter (100) of FIG. 1 represents a reduction in size relative to two, discrete inductors, operating the indirectly coupled prior art DC-DC converter (100) in accordance with the timing diagram of FIG. 2 limits any further inductor and capacitance reduction due to many factors, including for example: efficiency, current ripple, and so on.

SUMMARY OF THE INVENTION

Methods and apparatus for dividing a single phase PWM signal into a plurality of phases are described in this specification. Such division of a single phase PWM signal into a plurality of phases includes: receiving, from a phase controller by a PWM frequency divider, an input pulse train comprising a period; and dividing, by the PWM frequency divider, the input pulse train amongst a plurality of output phases of the PWM frequency divider, including, at the onset of each period of the input pulse train: providing, on a next output phase of the PWM frequency divider, an output pulse train; and holding all other output phases at a tri-state voltage level.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary methods and dividing a single phase pulse-width modulation (PWM) signal into a plurality of phases in accordance with embodiments of the present invention are described with reference to the accompanying drawings, beginning with FIG. 3. As explained below in greater detail, such a multi-phase division of a PWM signal may control operation of a DC-DC converter in what is referred to in this specification as an identity switching matrix. For further explanation therefore, Figured 3 sets forth an identity switching DC-DC converter that includes a directly coupled inductor, operated in accordance with embodiments of the present invention.

Figure 1:
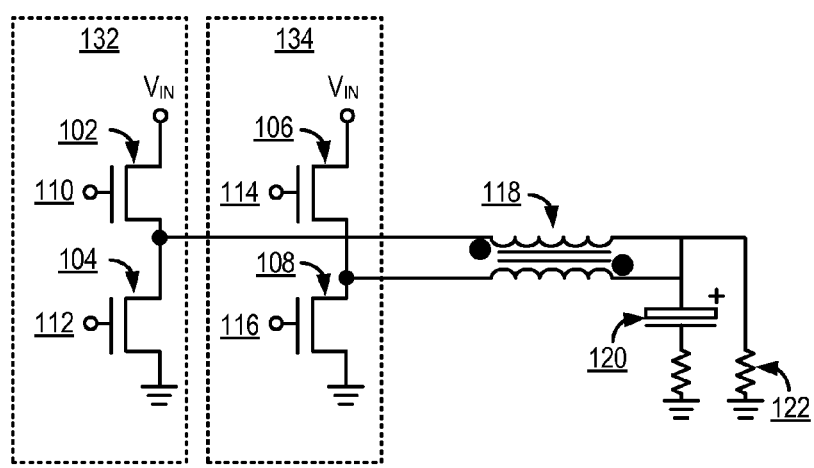
FIG. 1 sets forth a prior art DC-DC converter that includes an indirectly coupled inductor.
Figure 2:
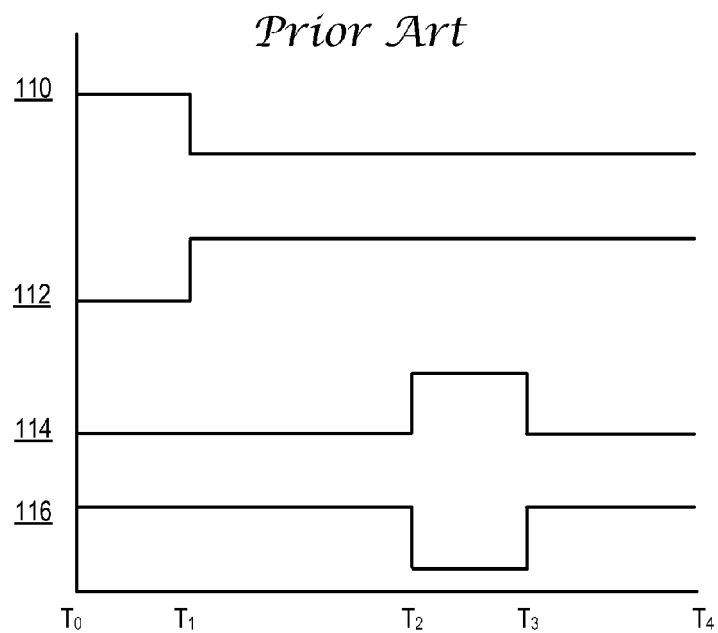
FIG. 2 sets forth an example timing diagram of activating the switches of the prior art DC-DC converter of FIG. 1.
Figure 3:
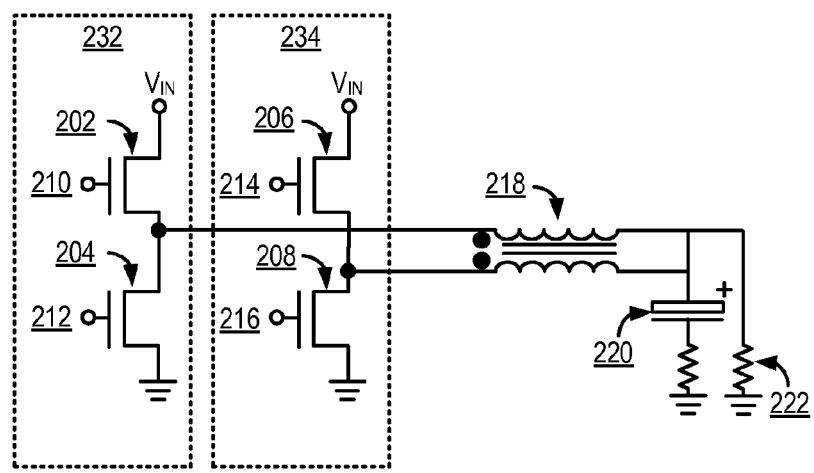
FIG. 3 sets forth sets forth an identity switching DC-DC converter that includes a directly coupled inductor, operated in accordance with embodiments of the present invention.

The example identity switching DC-DC converter (200) of FIG. 3 includes a directly coupled inductor (218) that includes a first coil element and a second coil element. The first coil element and second coil element are coupled to an output filter—the capacitor (220)—and a load represented by a resistor (222). Unlike the prior art indirectly coupled inductor (118) of FIG. 1, in the directly coupled inductor (218) in the example of FIG. 3, current generally flows in the opposite direction in the coils of the coupled inductor. That is, when current enters one dot, current is induced to exit the other dot.

The example identity switching DC-DC converter (200) of FIG. 3 also includes two power-switching phases (232, 234). A first power-switching phase (232) includes a high-side switch (202) and a low-side switch (204). The high-side switch (202) is configured, when activated by a control input (210), to couple a voltage source ($V_{IN}$) to the first coil element of the directly coupled inductor (218). The low-side switch (204) is configured, when activated by a control input (212), to couple the first coil element to a ground voltage.

The second power-switching phase (234) of the example identity switching DC-DC converter (200) of FIG. 3 includes a high-side switch (206) and a low-side switch (208). The high-side switch (206) of the second power-switching phase (234) is configured, when activated by a control input (214), to couple the voltage source ($V_{IN}$) to the second coil element of the directly coupled inductor (218). The low-side switch (208) of the second power-switching phase (234) is configured, when activated by a control input (216), to couple the second coil element to the ground voltage.

As will occur to readers of skill in the art, each of the switches (202, 204, 206, 208) in the example of FIG. 3 may be implemented as a Field Effect Transistor ('FET') or the like.

The identity switching DC-DC converter (200) of FIG. 3 is operated by alternatively activating each switch, where no two switches are activated at the same time. For further explanation, FIG. 4 sets forth an example timing diagram of activating switches of the identity switching DC-DC converter of FIG. 3.

The DC-DC converter of FIG. 3 is described as an 'identity switching' converter due to the pattern of activating switches when viewed in a matrix or table. The example table below describes the timing of the switch activations as seen in the example timing diagram of FIG. 4:

TABLE 1

| Switch Activation Pattern For Identity Switching DC-DC Converter (200) of FIG. 3 | | | | |
|---|---|---|---|---|
| Control Input, Switch | $T_0$-$T_1$ | $T_1$-$T_2$ | $T_2$-$T_3$ | $T_3$-$T_4$ |
| CI (210), HS Switch (202) | 1 | 0 | 0 | 0 |
| CI (212), LS Switch (204) | 0 | 1 | 0 | 0 |
| CI (214), HS Switch (206) | 0 | 0 | 1 | 0 |
| CI (216), LS Switch (208) | 0 | 0 | 0 | 1 |

In the example Table 1 above, it can be seen that the control input and associated switches are alternatively activated (represented by a '1' in the table) in a manner that forms an identity of the table. Further, no two switches are activated at the same time. As depicted in Table 1 and the example timing diagram (230) of FIG. 4: from time $T_0$-$T_1$, only the high-side switch (202) of the first power-switching phase (232) is activated; from time $T_1$-$T_2$, only the low-side switch (204) of the first power-switching phase (232) is activated; from time $T_2$-$T_3$, only the high-side switch (206) of the second power-switching phase (234) is activated; and from time $T_3$-$T_4$, only the low-side switch (208) of the second power-switching phase (234) is activated. In this way, each phase is utilized at a 180 degree offset and each high-side switch for a period of time according to:

$$\frac{D}{N},$$

where D represents a duty cycle and N represents the number of power-switching phases. Each low-side switch is therefore activated for a period of time according to:

$$\frac{(1-D)}{N}.$$

In this way, the number of phases is inversely proportional to the duty cycle of activating the switches—that is, the 'effective' duty cycle—and thereby is inversely proportional to the inductance of the directly coupled inductor. Increasing the number of phases, therefore, decreases the inductance.

Figure 4:
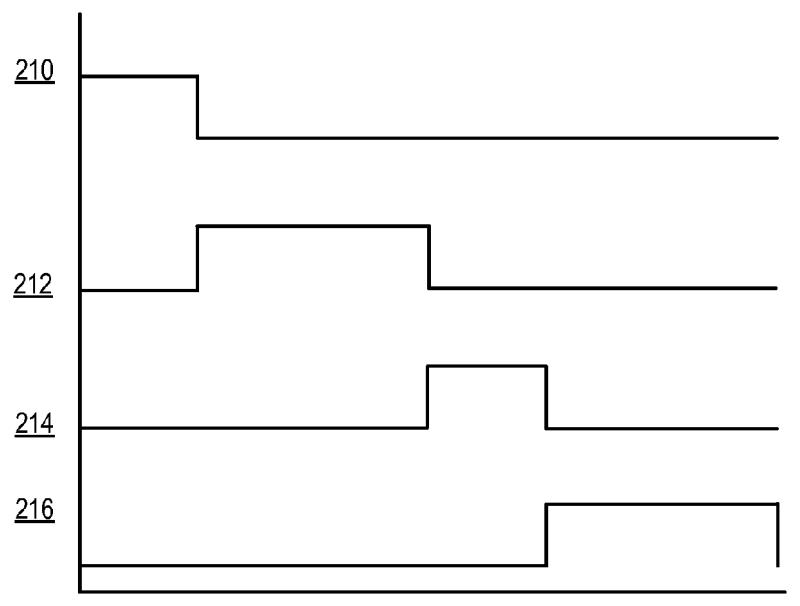
FIG. 4 sets forth an example timing diagram of activating switches of the identity switching DC-DC converter of FIG. 3.

And the transfer function of the identity switching DC-DC converter (200) of FIG. 3, when operated in accordance with the identity switching scheme in Table 1 and the timing diagram (230) of FIG. 4 is:

$$\frac{V_{OUT}}{V_{IN}} = \frac{D}{N}$$

Operating the example identity switching DC-DC converter (200) of FIG. 3 in accordance with the identity switching scheme in Table 1 and the timing diagram of FIG. 4 enables energy to be stored between deactivating the low-side switch (212) of the first power-switching phase (232) and activation of the high-side switch of the second power-switching phase (234), thus increasing overall system efficiency and reducing current ripple. That is, current ripple experienced by the magnetic core of the directly coupled inductor (218) and the output capacitor (220) is reduced, relative to circuits of the prior art, due in part to the effective reduced duty cycle of the switch activations. The current ripple experienced by the output filter capacitor (220) and the load (222) may be calculated as:

$$\frac{1}{f * L_{OL}} * \left(1 - \frac{V_{OUT}}{V_{IN}}\right) * \frac{V_{OUT}}{N},$$

where f represents the frequency of alternatively activating each switch, $L_{OL}$ represents the open loop inductance of the directly coupled inductor, N represents the number of power-switching phases, $V_{IN}$ represents the voltage of the voltage source and $V_{OUT}$ represents the voltage experienced at the filter and load.

FIGS. 3 and 4 generally depict an identity switching DC-DC converter configured with two phases and operation thereof, but readers of skill in the art will recognize that an identity switching DC-DC converter operated in accordance with embodiments of the present invention may have any number of phases. Further, the control inputs (210, 212, 214, and 216) receive a control signal from a source. In some embodiments, that source is a PWM frequency divider. For further explanation therefore, FIG. 5 sets forth an identity switching DC-DC converter that includes a plurality of power-switching phases and is controlled by a PWM frequency divider configured for operation in accordance with embodiments of the present invention.

Figure 5:
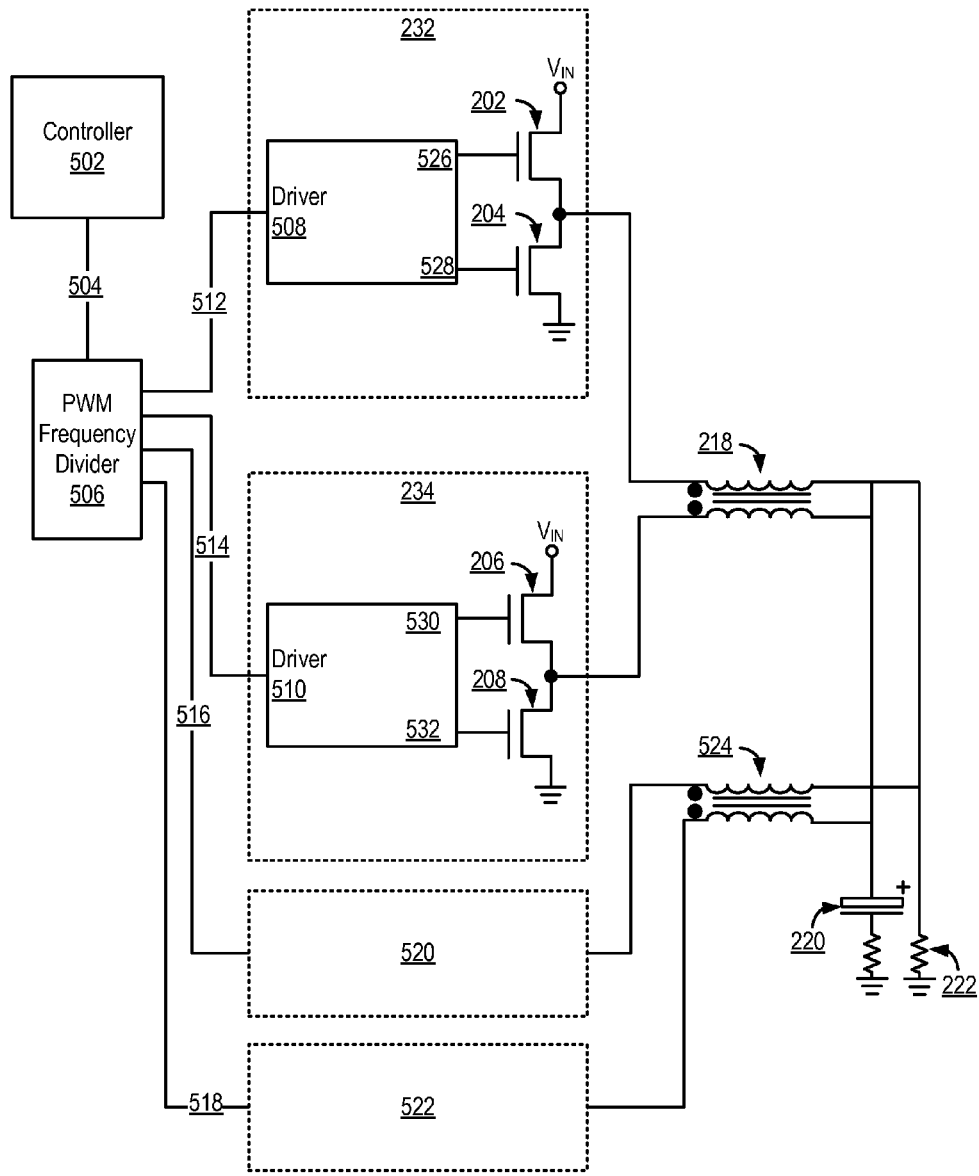
FIG. 5 sets forth an identity switching DC-DC converter that includes a plurality of power-switching phases and is controlled by a PWM frequency divider configured for operation in accordance with embodiments of the present invention.

The example DC-DC converter of FIG. 5 is similar the DC-DC converter of FIG. 3 in that the example DC-DC converter (500) includes a plurality of power-switching phases (232, 234, 520, 522) and a directly coupled inductor (218, 524). The directly coupled inductor (218, 524) includes a coil element. Each power-switching phase includes a high-side switch (202, 206) and a low-side switch (204, 208). The switches of the phases (520, 522) are not shown here for purposes of simplicity, but are configured similar to the other phases (232, 234). The high-side switch (202, 206) of each phase (232, 234, 520, 522) is configured, when activated, to couple a voltage source ($V_{IN}$) to the coil element and the low-side switch (204, 208) is configured, when activated, to couple the coil element to a ground voltage. The coil element is coupled to an output filter (220) and a load (222).

The example identity switching DC-DC converter (500) of FIG. 5 differs from that of FIG. 3, however, in that the each of power-switching phases (232, 234, 520, 522) also includes a driver (510) configured to activate the high and low side switches of the phase. The driver (510) in the example of FIG. 5 may be implemented in a variety of ways including, for example, as a field programmable gate array (FPGA), application specific integrated circuit (ASIC), analog circuitry, digital circuitry, or some combination of such circuitry. The driver (508, 510) activates each switch via outputs (526, 528, 530, 532) of the driver responsive to a signal received at the input of the driver. The driver receives such a signal from a PWM frequency divider (506).

A PWM frequency divider may be implemented in a variety of ways including, for example, with an FPGA, ASIC, digital logic, analog circuitry, or some combination of such devices. The example PWM frequency divider (506) of FIG. 5 is configured to: receive, from a phase controller (502), an input pulse train (502). A pulse train, as the term is used in this specification, refers to a signal that repetitively varies between a logic high voltage level and a logic low voltage level, such as a square wave. Each repetition of the signal occurs within a period. Each period includes a transition to a logic high voltage level and a transition to a logic low voltage level. The phase controller (502) that provides such a signal in the example of FIG. 5 may be any type of circuitry including digital, analog or some combination. In some embodiments, the phase controller may be a clock generator for a system in which the DC-DC converter (500) is a component.

The PWM frequency divider (506) in the example of FIG. 5 is also configured to divide the input pulse train (504) amongst a plurality of output phases (512, 514, 516, 518). The PWM frequency divider (506) divides the input pulse train amongst the output phases by carrying out the following steps at the onset of each period of the input pulse train: providing, on a next output phase of the PWM frequency divider, an output pulse train and holding all other output phases at a tri-state voltage level. The signal provided on the output phase to each driver transitions between one of three states: logic high, tri-state, and logic low. Consider, for example, that logic high is 1 volt (V), logic low is −1 V and tri-state is 0 V. At the onset of each period of the input pulse train the PWM frequency divider (506) provides a 'next' output phase with an output pulse train (a signal that varies from logic high to logic low) and ensures that all other output phases are at the tri-state voltage level. The term 'next' here refers to the fact that the frequency divider provides the output pulse train signal to each output phase cyclically. In FIG. 5, for example, the PWM frequency divider (506) may provide the output pulse train on output phase (512), while holding all other output phases (514, 516, 518) at a tri-state voltage level. Then, at the outset of the next period of the input pulse train, the PWM frequency divider may provide the output pulse train on output phase (514) while holding all other output phases (512, 516, 518) at the tri-state voltage level. This cycle may continue so that the PWM frequency divider (506) provides the output pulse train to output phase (516), then to output phase (518). At this point, the PWM frequency divider (506) may cycle back and provide the output pulse train on output phase (512) where the cycles will continue indefinitely.

Figure 6:
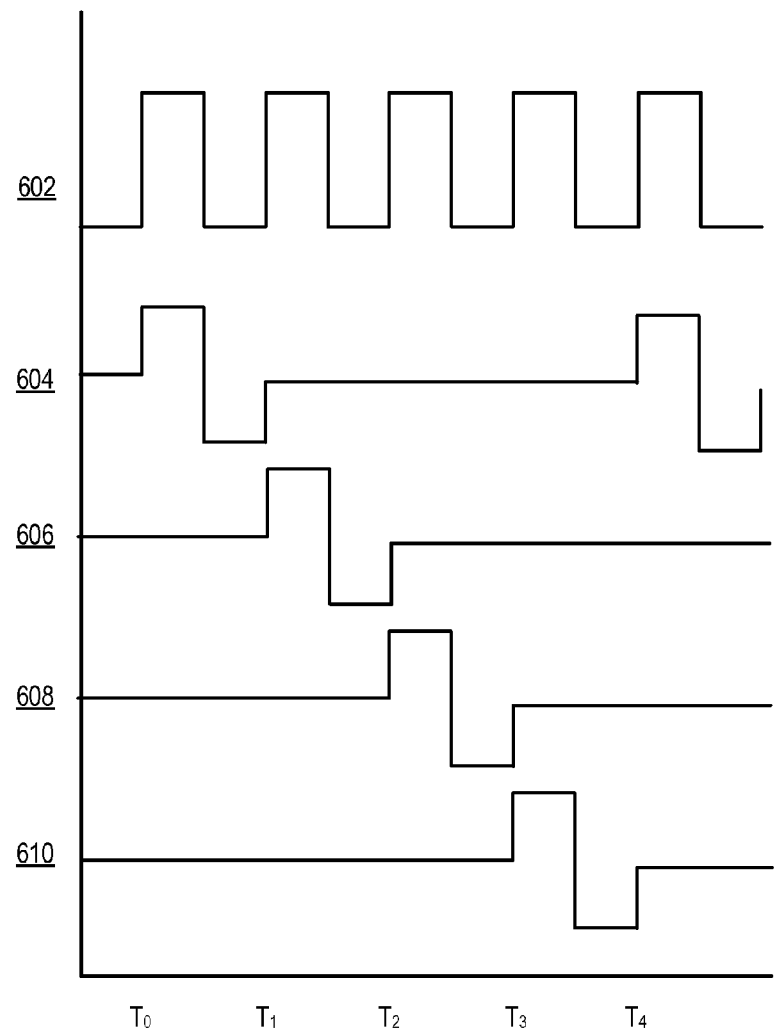
FIG. 6 sets forth an example timing diagram of signals received and outputted by a PWM frequency divider operating in accordance with embodiments of the present invention.

The cyclical nature of the PWM frequency divider (506) is illustrated in FIG. 6. Turning briefly there, FIG. 6 sets forth an example timing diagram (612) of signals received and outputted by a PWM frequency divider operating in accordance with embodiments of the present invention. In FIG. 6, signal (602) is the input pulse train received by the PWM frequency divider. Signals (604-610) are the signals provided by the PWM frequency divider on separate output phases. Signal (604), for example, may be the signal carried by output phase (512 of FIG. 5), signal (606) may be the signal carried by output phase (514 of FIG. 5), signal (608) may be the signal carried by output phase (516 of FIG. 5), and signal (608) may be the signal carried by output phase (516 of FIG. 5).

Beginning at time $T_0$, the input pulse train begins a period in which the input pulse train transition from logic high and returns to logic low. At the onset of that period, the PWM frequency divider provides on the signal (602) of the first output phase, an output pulse train that transitions from a tri-state voltage, to logic high, then to logic low at the end of the period of the input pulse train. During this period, the PWM frequency divider holds the signal carried on all other output phases at the tri-state voltage level.

At time $T_1$, a second period of the input pulse train begins. At this time, the PWM frequency divider provides the output pulse train on the next output phase—the signal (606) carried by the second output phase. The output pulse train again transitions from the tri-state voltage level to logic high then to logic low. During this period of the output pulse train, the signals of the other output phases are held to the tri-state voltage level.

The above steps repeat for each subsequent period of the input pulse train until the PWM frequency divider provides an output pulse train on each of the signals carried by each of the output phases. When all output phases have carried the output pulse train, the PWM begins the process again with the first output phase.

Returning now to FIG. 5, the PWM frequency divider (506) provides the output pulse train on output phases coupled to the drivers (508, 510) of each of the power-switching phases (232, 234, 520, 522) of the DC-DC converter (500). As mentioned above, the driver (508, 510) of each phase is configured to activate the high side switch and the low side switch of each power-switching phase responsive to the signal received at the input of the driver; the signal received on the output phase of the PWM frequency divider. To that end, each driver (508, 510) is configured to:

activate the high side switch and deactivate the low side switch when the output pulse train of the output phase is a logic high voltage level, activate the low side switch and deactivate the high side switch when the output pulse train of the output phase is a logic low voltage level, and deactivate the high and low side switches when the output pulse train of the output phase is a tri-state voltage level.

In this way, when a driver receives the output pulse train from the PWM frequency divider, the driver first activates the high side switch while keeping the low side switch deactivated, then activates the low side switch and deactivates the high side switch. When the driver receives the tri-state voltage (all other times than when receiving the output pulse train) from the PWM frequency divider, the driver deactivates both switches. As the PWM frequency divider provides the output pulse train to each driver separately and cyclically and at all other times provides each driver with the tri-state voltage, an identity switching control scheme like those described above is employed in the example of FIG. 5.

Figure 7:
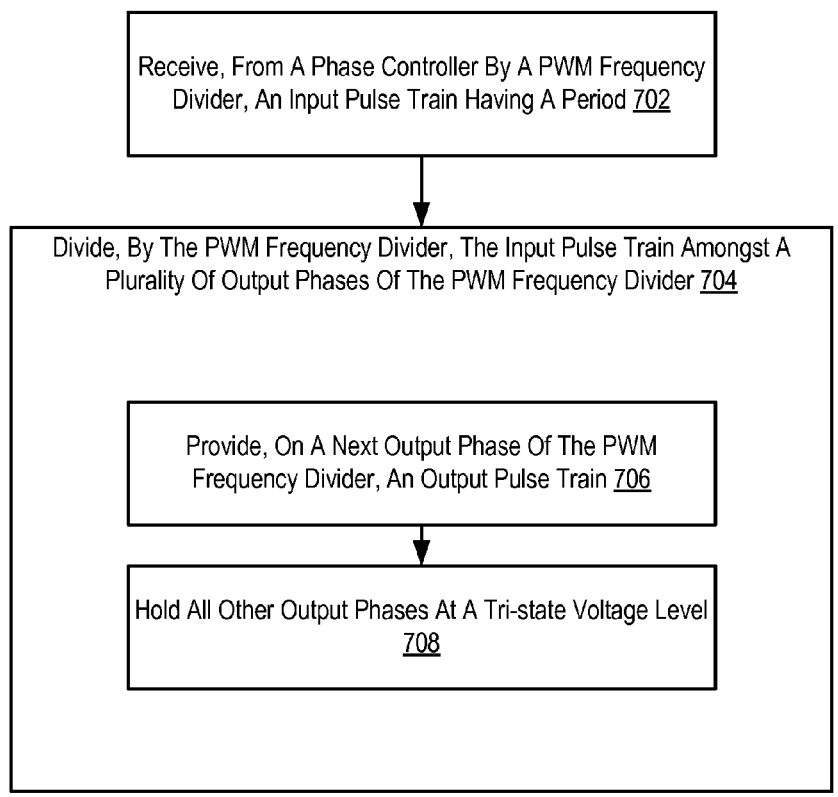
FIG. 7 sets forth a flow chart illustrating an exemplary method for dividing a single phase PWM signal into a plurality of phases.

For further explanation, FIG. 7 sets forth a flow chart illustrating an exemplary method for dividing a single phase PWM signal into a plurality of phases. The method of FIG. 7 includes receiving (702), from a phase controller by a PWM frequency divider, an input pulse train comprising a period. Receiving (702) an input pulse train may be carried out in various ways including, for example, by receiving a system clock signal from a clock generator.

The method of FIG. 7 also includes dividing (704), by the PWM frequency divider, the input pulse train amongst a plurality of output phases of the PWM frequency divider. In the example of FIG. 7, dividing (704), by the PWM frequency divider, the input pulse train amongst a plurality of output phases of the PWM frequency divider includes, at the onset of each period of the input pulse train: providing (706), on a next output phase of the PWM frequency divider, an output pulse train; and holding (708) all other output phases at a tri-state voltage level.

Providing (706) an output pulse train to a next output phase of the PWM frequency divider at the onset of each phase of the input pulse train may be carried out in various ways. In some embodiments, the PWM frequency divider may effectively operate with a cyclical counter that provides a selection signal to a multiplexer. The counter may increment upon the onset of each period of the input pulse train. The multiplexer may provide the signal received at an input to one of a plurality of outputs in dependence upon the selection signal received from the cyclical counter. The signal received at the input of the multiplexer may be the input pulse train itself. In this way, the input pulse train is provided to a single output of the multiplexer for a first period, then when the counter increments, the input pulse train is provided to a next output of the multiplexer for a second period, and so on.

Holding (708) output phases at a tri-state voltage level may also be carried out in various ways. In some embodiments, for example, each output phase may be coupled to a pull-down or pull-up resistor that couples the phase to the tri-state voltage.

Figure 8:
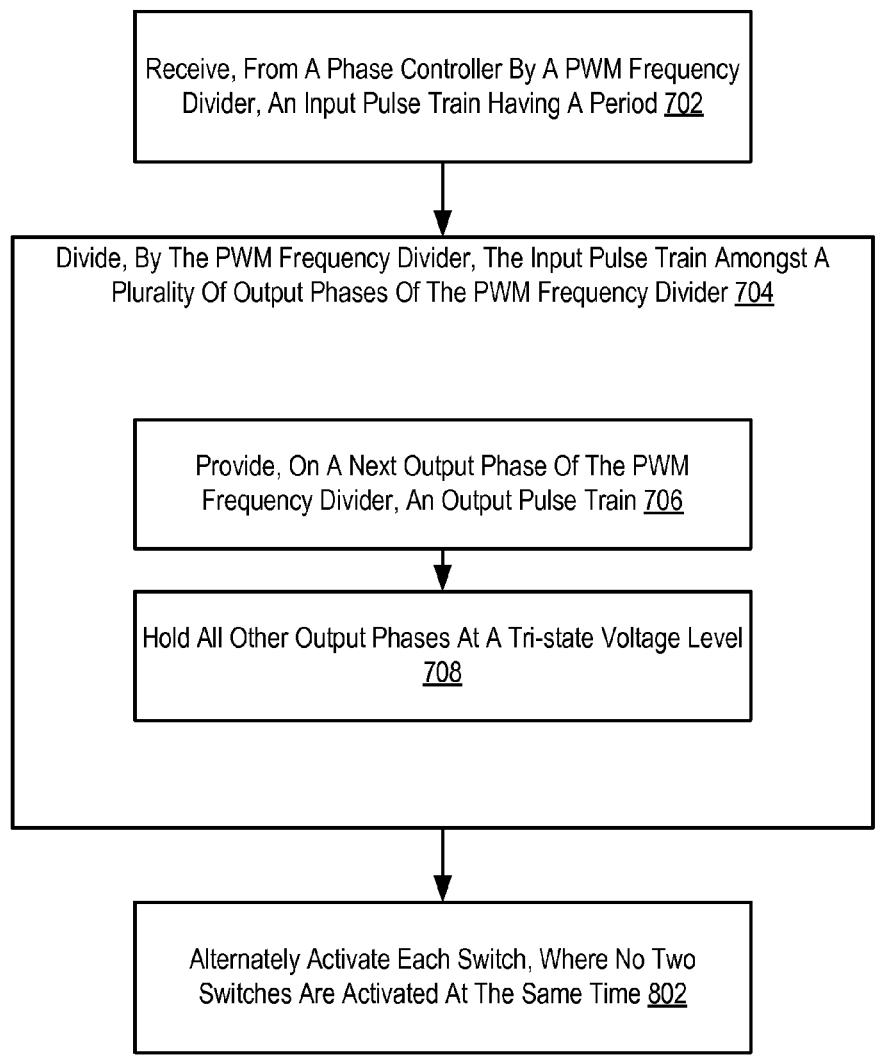
FIG. 8 sets forth a flow chart illustrating another exemplary method for dividing a single phase PWM signal into a plurality of phases.

FIG. 8 sets forth a flow chart illustrating another exemplary method for dividing a single phase PWM signal into a plurality of phases. The method of FIG. 8 is similar to the method of FIG. 7 in that the method of FIG. 8 also includes receiving (702) an input pulse train comprising a period and dividing (704) the input pulse train amongst a plurality of output phases of the PWM frequency divider. Also in the method of FIG. 8, dividing (704) the input pulse train is carried out by, at the onset of each period of the input pulse train, providing (706), on a next output phase of the PWM frequency divider, an output pulse train and holding (708) all other output phases at a tri-state voltage level.

The method of FIG. 8 differs from the method of FIG. 7, however, in that in the method of FIG. 8 the PWM frequency divider is coupled to a DC-DC converter via the plurality of output phases. Such a DC-DC converter may be similar to the DC-DC converter illustrated in FIG. 5, which includes a directly coupled inductor having a coil element coupled to an output filter and a load. The DC-DC converter may also include a plurality of power-switching phases, with each phase having a high-side switch, a low-side switch and a driver. Each switch may be implemented as a FET.

The high-side switch of each power-switching phase is configured, when activated via the driver, to couple a voltage source to the coil element and the low-side switch is configured, when activated via the driver, to couple the coil element to a ground voltage. The driver is coupled to one of the plurality of output phases of the PWM frequency divider and is configured to: activate the high side switch and deactivate the low side switch when the output pulse train of the output phase is a logic high voltage level; activate the low side switch and deactivate the high side switch when the output pulse train of the output phase is a logic low voltage level and the driver is configured to deactivate the high and low side switches when the output pulse train of the output phase is a tri-state voltage level.

The method of FIG. 8 also differs from the method of FIG. 7 in that the method of FIG. 8 includes alternately activating (802), by the drivers of the plurality of power-switching phases, each switch, where no two switches are activated at the same time responsive to receiving the output pulse train of the plurality of output phases of the frequency divider. Alternatively activating (802) each switch may be carried out by activating each high-side switch for a period of time according to:

$$\frac{D}{N}$$

where D represents a duty cycle and N represents the number of power-switching phases and activating each low-side switch for a period of time according to:

$$\frac{(1-D)}{N}.$$

In some embodiments, the number of power-switching phases of the DC-DC converter may be inversely proportional to the duty cycle of activating the switches and thereby inversely proportional to the inductance of the directly coupled inductor. Also, the current ripple experienced by the filter and the load in such a DC-DC converter may be:

$$\frac{1}{f*L_{OL}}*\left(1-\frac{V_{OUT}}{V_{IN}}\right)*\frac{V_{OUT}}{N},$$

where f represents the frequency of alternatively activating each switch, $L_{OL}$ represents the open loop inductance of the directly coupled inductor, N represents the number of power-switching phases, $V_{IN}$ represents the voltage of the voltage source and $V_{OUT}$ represents the voltage experienced at the filter and load.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dividing a single phase pulse-width modulation (PWM) signal into a plurality of phases, the method comprising:
receiving, from a phase controller by a PWM frequency divider, an input pulse train comprising a period; and
dividing, by the PWM frequency divider, the input pulse train amongst a plurality of output phases of the PWM frequency divider, including, at the onset of each period of the input pulse train:
providing, on a next output phase of the PWM frequency divider, an output pulse train that transitions from a tri-state voltage level to a logic high voltage level at the onset of a period of the input pulse train and transitions from the logic high voltage level to a logic low voltage level toward the end of the period of the input pulse train; and
holding all other output phases at the tri-state voltage level that is between the logic high voltage level and the logic low voltage level.

2. The method of claim 1 wherein the PWM frequency divider is coupled to a Direct Current (DC)-DC converter via the plurality of output phases, the DC-DC converter comprising:
a directly coupled inductor comprising a coil element coupled to an output filter and a load; and
a plurality of power-switching phases, with each phase comprising a high-side switch, a low-side switch and a driver, wherein the high-side switch of each power-switching phase is configured, when activated via the driver, to couple a voltage source to the coil element and the low-side switch of each power-switching phase is configured, when activated via the driver, to couple the coil element to a ground voltage, wherein the driver is coupled to one of the plurality of output phases of the PWM frequency divider and the driver is configured to activate the high side switch and deactivate the low side switch when the output pulse train of the output phase is a logic high voltage level, the driver is configured to activate the low side switch and deactivate the high side switch when the output pulse train of the output phase is a logic low voltage level, and the driver is configured to deactivate the high and low side switches when the output pulse train of the output phase is a tri-state voltage level; and
the method further comprises:
responsive to receiving the output pulse train of the plurality of output phases of the frequency divider:
alternately activating, by the drivers of the plurality of power-switching phases, each switch, wherein no two switches are activated at the same time.

3. The method of claim 2 wherein alternatively activating each switch further comprises:
activating each high-side switch for a period of time according to:

$$\frac{D}{N}$$

where D represents a duty cycle and N represents the number of power-switching phases; and
activating each low-side switch for a period of time according to:

$$\frac{(1-D)}{N}.$$

4. The method of claim 2 wherein the number of power-switching phases is inversely proportional to the duty cycle of activating the switches and thereby inversely proportional to the inductance of the directly coupled inductor.

5. The method of claim 2 wherein current ripple experienced by the filter and the load comprises:

$$\frac{1}{f*L_{OL}} * \left(1 - \frac{V_{OUT}}{V_{IN}}\right) * \frac{V_{OUT}}{N},$$

where f represents the frequency of alternatively activating each switch, $L_{OL}$ represents the open loop inductance of the directly coupled inductor, N represents the number of power-switching phases, $V_{IN}$ represents the voltage of the voltage source and $V_{OUT}$ represents the voltage experienced at the filter and load.

6. The method of claim 2 wherein each high-side switch and each low-side switch comprises a Field Effect Transistor.

7. The method of claim 1 wherein the PWM frequency divider comprises a Field Programmable Gate Array (FPGA).

8. An apparatus for dividing a single phase pulse-width modulation (PWM) signal into a plurality of phases, the apparatus comprising a computer processor, a computer memory operatively coupled to the computer processor, the computer memory having disposed within it computer program instructions that, when executed by the computer processor, cause the apparatus to carry out the steps of:
receiving, from a phase controller by a PWM frequency divider, an input pulse train comprising a period; and
dividing, by the PWM frequency divider, the input pulse train amongst a plurality of output phases of the PWM frequency divider, including, at the onset of each period of the input pulse train:
providing, on a next output phase of the PWM frequency divider, an output pulse train that transitions from a tri-state voltage level to a logic high voltage level at the onset of a period of the input pulse train and transitions from the logic high voltage level to a logic low voltage level toward the end of the period of the input pulse train; and
holding all other output phases at the tri-state voltage level that is between the logic high voltage level and the logic low voltage level.

9. The apparatus of claim 8 wherein the PWM frequency divider is coupled to a Direct Current (DC)-DC converter via the plurality of output phases, the DC-DC converter comprising:
a directly coupled inductor comprising a coil element coupled to an output filter and a load; and
a plurality of power-switching phases, with each phase comprising a high-side switch, a low-side switch and a driver, wherein the high-side switch of each power-switching phase is configured, when activated via the driver, to couple a voltage source to the coil element and the low-side switch of each power-switching phase is configured, when activated via the driver, to couple the coil element to a ground voltage, wherein the driver is coupled to one of the plurality of output phases of the PWM frequency divider and the driver is configured to activate the high side switch and deactivate the low side switch when the output pulse train of the output phase is a logic high voltage level, the driver is configured to activate the low side switch and deactivate the high side switch when the output pulse train of the output phase is a logic low voltage level, and the driver is configured to deactivate the high and low side switches when the output pulse train of the output phase is a tri-state voltage level; and the apparatus further comprises computer program instructions that when executed causes the apparatus to carry out the steps of:

responsive to receiving the output pulse train of the plurality of output phases of the frequency divider:

alternately activating, by the drivers of the plurality of power-switching phases, each switch, wherein no two switches are activated at the same time.

10. The apparatus of claim 9 wherein alternatively activating each switch further comprises:

activating each high-side switch for a period of time according to:

$$\frac{D}{N}$$

where D represents a duty cycle and N represents the number of power-switching phases; and activating each low-side switch for a period of time according to:

$$\frac{(1-D)}{N}.$$

11. The apparatus of claim 9 wherein the number of power-switching phases is inversely proportional to the duty cycle of activating the switches and thereby inversely proportional to the inductance of the directly coupled inductor.

12. The apparatus of claim 9 wherein current ripple experienced by the filter and the load comprises:

$$\frac{1}{f*L_{OL}}*\left(1-\frac{V_{OUT}}{V_{IN}}\right)*\frac{V_{OUT}}{N},$$

where f represents the frequency of alternatively activating each switch, $L_{OL}$ represents the open loop inductance of the directly coupled inductor, N represents the number of power-switching phases, $V_{IN}$ represents the voltage of the voltage source and $V_{OUT}$ represents the voltage experienced at the filter and load.

13. The apparatus of claim 9 wherein each high-side switch and each low-side switch comprises a Field Effect Transistor.

14. The apparatus of claim 8 wherein the PWM frequency divider comprises a Field Programmable Gate Array (FPGA).

* * * * *